United States Patent
Verbrugge et al.

(10) Patent No.: US 7,484,735 B2
(45) Date of Patent: Feb. 3, 2009

(54) REVERSIBLE THERMALLY EXPANDABLE AND/OR CONTRACTIBLE SEAL ASSEMBLIES

(75) Inventors: Mark W. Verbrugge, Troy, MI (US); Alan L. Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 481 days.

(21) Appl. No.: 11/008,089

(22) Filed: Dec. 9, 2004

(65) Prior Publication Data

US 2006/0125188 A1 Jun. 15, 2006

(51) Int. Cl.
*F16J 3/00* (2006.01)
(52) U.S. Cl. .................... 277/628; 277/933
(58) Field of Classification Search ............. 277/628, 277/650, 929–931, 933, 319, 630, 637, 639, 277/644, 921; 49/475.1, 480.1
See application file for complete search history.

(56) References Cited

U.S. PATENT DOCUMENTS

| | | | | |
|---|---|---|---|---|
| 6,009,669 A | * | 1/2000 | Jardine et al. | 49/316 |
| 6,702,301 B1 | * | 3/2004 | Davies et al. | 277/646 |
| 2005/0198904 A1 | * | 9/2005 | Browne et al. | 49/374 |
| 2005/0199440 A1 | * | 9/2005 | Keefe et al. | 181/284 |
| 2005/0206095 A1 | * | 9/2005 | Keefe et al. | 277/628 |
| 2005/0206096 A1 | * | 9/2005 | Browne et al. | 277/628 |

OTHER PUBLICATIONS

"Silicone-Rubber Micovalves Actuated by Paraffin" NASA Tech Briefs, Sep. 2004, pp. 56, 58.

* cited by examiner

Primary Examiner—Wiliam L. Miller

(57) ABSTRACT

Seal assemblies employing reversible thermally expandable and/or contractible material that can be controlled and remotely changed to alter the seal effectiveness, wherein the seal assemblies actively change dimensional and/or modulus properties such as stiffness, shape orientation, and the like. In this manner, in seal applications such as a vehicle door application, door opening and closing efforts can be minimized yet seal effectiveness can be maximized.

30 Claims, 1 Drawing Sheet

REVERSIBLE THERMALLY EXPANDABLE AND/OR CONTRACTIBLE SEAL ASSEMBLIES

BACKGROUND

This disclosure relates to seals and more particularly, to reversible thermally expandable and/or contractible seal assemblies for sealing opposing surfaces.

Current methods and assemblies for sealing opposing surfaces such as doors and trunk lids, for example, include the use of flexible elastic membranes and structures that sealingly compress upon pressing contact of the opposing surfaces. Typical materials include various forms of elastomers, e.g., foams and solids, that are formed into structures having solid and/or hollow cross sectional structures. The geometries of the cross sections are varied and may range from circular forms to irregular forms having multiple slots and extending vanes.

Traditional passive door seal design as noted above must compromise between functional adequacy and user operation. Typically, improved sealing results from greater contact area and adequate pressure over the seal length. This approach generally requires an increasing degree of force to close the door as compared to less contact area and force. Additionally, manufacturing tolerances which vary over the width of the doors may require a greater seal compression over the length of the seal than is necessary to ensure that the point of the door located the furthest from the frame will have adequate sealing area and pressure to prevent moisture or noise from entering the vehicle. This may result in more total compression and force over the entire door than is necessary, thus increasing the door closure force. In addition, general manufacturing issues including interactions of various components involved in sealing technologies may result in increased manufacturing cycle time due to the necessity to redesign the seal to match vehicle conditions.

Another problem with current seals is the tradeoff in seal effectiveness. Seal effectiveness can generally be increased by increasing the interface pressure and/or area of the seal. In automotive applications, such as vehicle doors, the increased interface pressure and/or area of the seal results in increased door opening and closing efforts.

Accordingly, it is desirable to have active seal assemblies that can be controlled and remotely changed to alter the seal effectiveness, wherein the active seal assemblies actively change modulus properties. In this manner, in seal applications such as the vehicle door application noted above, door opening and closing efforts can be minimized yet seal effectiveness can be maximized.

BRIEF SUMMARY

Disclosed herein are active seal assemblies and methods of use. In one embodiment, a seal assembly comprises a seal membrane formed of an elastic material, the seal membrane comprising a sealed interior region; a reversible thermally expandable and/or contractible material disposed in the interior region; and at least one electrically conductive element in thermal communication with the reversible thermally expandable and/or contractible material.

In another embodiment, the seal assembly comprises a seal membrane formed of an elastic material, the seal membrane comprising a sealed interior region; a reversible thermally expandable and/or contractible material disposed in the interior region; and at least one conduit in thermal communication with the reversible thermally expandable and/or contractible material, wherein the conduit is in fluid communication with a fluid effective to heat and/or cool the reversible thermally expandable and/or contractible material.

A method for selectively sealing a first surface against a second surface comprises attaching a seal assembly to a selected one of the first surface and the second surface, wherein the seal assembly comprises a seal membrane formed of an elastic material comprising a sealed interior region, a reversible thermally expandable and/or contractible material disposed in the interior region; and at least one fluid conduit in thermal communication with the reversible thermally expandable and/or contractible material, wherein the seal membrane contacts the selected one of first surface and the second surface; and flowing a fluid through the conduit to selectively expand and/or contract the reversible thermally expandable and/or contractible material and increase or decrease a sealing force of the seal membrane against the first surface and the second surface.

In another embodiment, a method for selectively sealing a first surface against a second surface comprises attaching a seal assembly to a selected one of the first surface and the second surface, wherein the seal assembly comprises a seal membrane formed of an elastic material comprising a sealed interior region, a reversible thermally expandable and/or contractible material disposed in the interior region; and at least one fluid conduit in thermal communication with the reversible thermally expandable and/or contractible material, wherein the seal membrane contacts the selected one of first surface and the second surface; and flowing a fluid through the conduit to selectively expand and/or contract the reversible thermally expandable and/or contractible material and increase or decrease a sealing force of the seal membrane against the first surface and the second surface.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
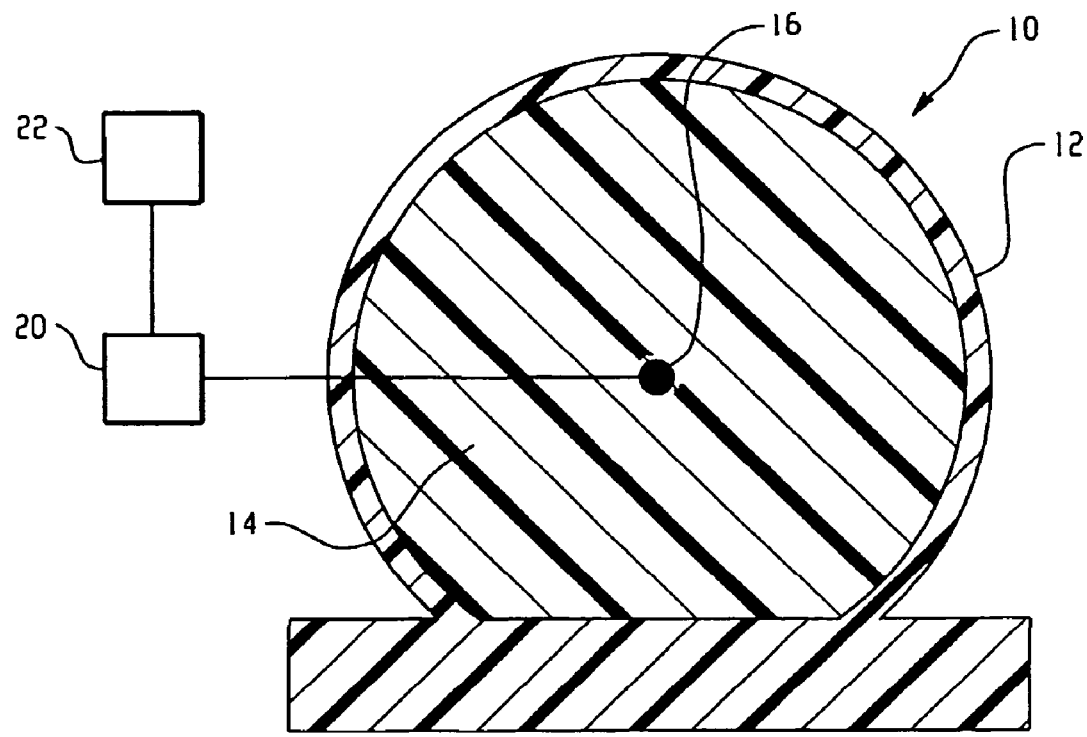
FIG. 1 illustrates a cross sectional view of a seal assembly in accordance with one embodiment.

Disclosed herein are reversible thermally expandable and/or contractible sealing assemblies and methods of use, wherein the shape and/or modulus properties of the seal assemblies can be remotely activated and/or controlled to selectively provide increased seal effectiveness. For door applications, the seal assemblies can be programmed to provide minimal opening and closing efforts in addition to the increased seal effectiveness properties. Although reference will be made herein to automotive applications, it is contemplated that the seal assemblies can be employed for sealing opposing surfaces for various interfaces between opposing surfaces such as refrigerator doors, windows, drawers, and the like. For automotive applications, the sealing assemblies are preferably utilized between an opening in a vehicle and a surface in sliding or sealing engagement with the opening such as a vehicle door, a side passenger sliding door, window, sunroof, hatch, tailgate, and the like.

The seal assemblies generally comprise a reversible thermally expandable and/or contractible material disposed within a sealed membrane. In one embodiment, the percent volume of the expansion and/or contraction of the material can be varied as a function of temperature as well as a function of phase change, e.g., liquid to solid. In another embodiment, the coefficient of thermal expansion of the material can be varied to provide a dimensional and flexural property change to the sealed membrane.

During operation of the seal assembly, the reversible thermally expandable and/or contractible material can be configured to provide an enhancement to a closure mechanism or be configured to function as a mechanical closure in addition to providing selective and controlled sealing engagement. By utilizing the material as described above within the seal membrane, the seal assembly can reversibly change its modulus properties to provide improved sealing engagement between opposing surfaces, provide minimal effort to door opening and closing, as well as provide a closure mechanism, where desired and configured. Applying an activation signal to the material can effect the reversible change. Suitable activation signals will depend on the type of material as well as the type of seal system desired. For example, the activation signal provided for reversibly changing the shape and modulus properties of the seal assembly structure may include heating the material to effect the desired change and/or may include cooling the material.

Optionally, the sealing assembly structure may include one or more sensors that are used in combination with enhanced control logic to, for example, maintain the same level of sealing force independent of environmental conditions, e.g., humidity, temperature, pressure differential between interior and environment, and the like.

The seal assembly as described herein permits the remote and automatic control of the sealing function and provides enhancements in sealing functionality through software modifications as opposed to hardware changes. For example, in the case of vehicle doors, control logic can be utilized to active the material, i.e., seal assembly, upon opening or closing of the door. Switches can be disposed in the door handle or door pillars or doors in operative communication with sensors that activate the material upon door motion, change in door gap with respect to the vehicle body, movement of the door handle, powered opening of lock assemblies, and the like. Similarly, the key fob can be programmed to trigger activation from a distance such as may be desired as an occupant approaches the vehicle. In this manner, opening and closing can be programmed with minimal effort or resistance as contributed by forces associated with the seal assembly.

The various applications that can be utilized with the seal assembly include, but are not intended to limited to, seal assisted latching; noise reduction; door opening and closing force reduction; itch reduction and/or elimination; power off sealing; power on sealing; and the like.

As shown in FIG. 1, an exemplary seal assembly, generally indicated as 10, comprises a seal membrane 12 and a reversible thermally expandable and/or contractible material 14 disposed within the seal membrane 12. At least one electronically conductive element 16 is in thermal communication with the reversible thermally expandable and/or contractible material 14. In one embodiment, the at least one electrically conductive element 16 is disposed within the seal membrane 12. The at least one electrically conductive element 16 provides ohmic heating in an amount effective to provide a desired amount of dimensional and/or flexural modulus change. In one embodiment, the at least one electrically conductive element 16 comprises a thermoelectric cooler to provide a means for cooling the reversible thermally expandable and/or contractible material 14 disposed within the seal membrane 12. In this manner, the material can be made to contract in response to cooling.

Figure 2:
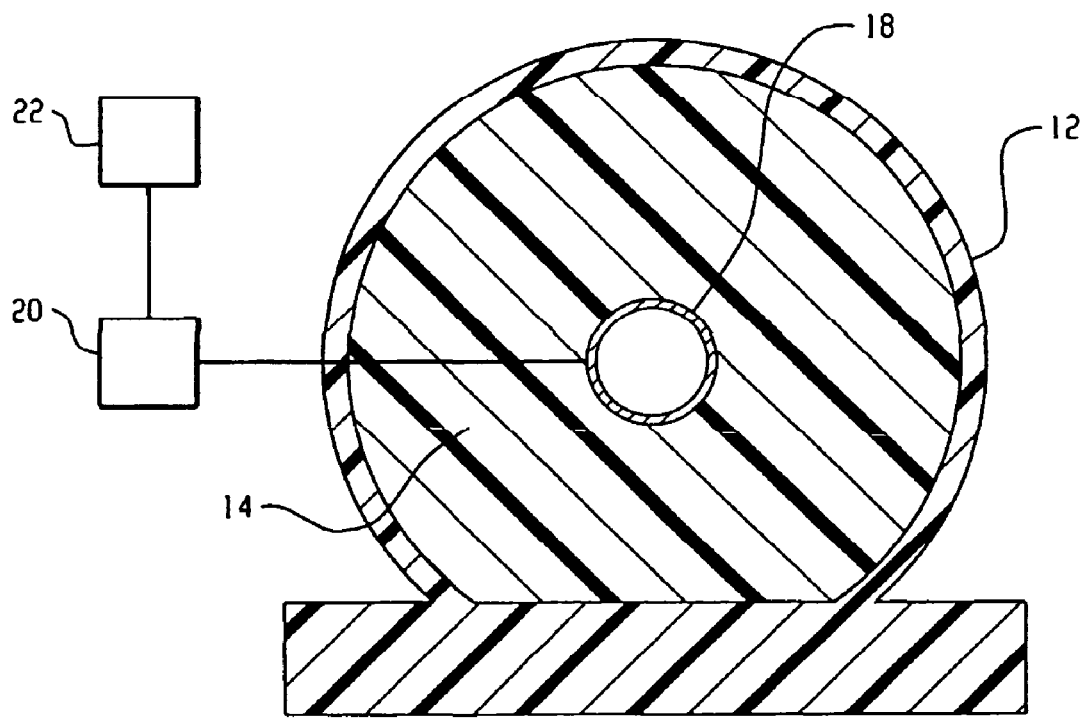
FIG. 2 illustrates a cross sectional view of a seal assembly in accordance with another embodiment.

Optionally, at least one fluid conduit 18 is disposed within the seal membrane as shown in FIG. 2, wherein the conduit is in fluid communication with a fluid effective to heat and/or cool the reversible thermally expandable and/or contractible material. For example, in the case of an automotive seal application, the fluid can be antifreeze fluid from a radiator, cool air from an air conditioner, combinations comprising at least one of the foregoing, and the like.

The seal assembly further includes an activation device 20, and a controller 22 in operative communication with the activation device for providing a thermal activation signal to the material.

In one embodiment, the reversible thermally expandable and/or contractible material 14 is selected to have a coefficient of thermal expansion effective to provide a desired amount of dimensional and or flexural modulus change to the seal membrane. For example, in one embodiment, the so-called Coefficient of Cubic Expansion is greater than $4 \times 10^{-4}$ $(°C.)^{-1}$ at 20° C. As an example, a standard paraffin with a Coefficient of Cubic Expansion of $K=5.88 \times 10^{-4}$ $(°C.)^{-1}$ at 20° C. can be employed [Table 3-150. Cubic Expansion of Solids, p. 3-101 of the Chemical Engineers' Handbook, $5^{th}$ edition, edited by R. H. Perry and C. H. Chilton]. That is, if $V_1$ and $V_2$ are the volumes at temperatures $T_1$ and $T_2$, respectively, $V_2=V_1[1+K(T_2-T_1)]$. In another embodiment, the reversible thermally expandable and/or contractible material 14 is selected to have a % volume change between liquid and solid phases of at least 5% within an operating temperature range of −30° to about 200° C.

Suitable reversible thermally expandable and/or contractible materials include, but are not intended to be limited to, paraffins, elastomers, and various polymers such as that exhibit the stipulated amounts of percent volume change and/or coefficients of thermal expansion. Suitable elastomers and various other polymers include, for example, urethane elastomers, styrene-butadiene elastomers, ethylene vinyl acetate copolymers, polybutylenes, polyethylenes, various ionomers, fluorocarbons, various rubbers, shape memory polymers, and the like.

Paraffin waxes are mixtures of straight-chained hydrocarbons that are generally obtained by fractional distillation of crude oils. Structurally, suitable paraffins can be defined by Formula (I):

$$C_nH_{(2n+2)} \qquad (I)$$

wherein n is an integer from about 20 to about 35.

The seal membrane 12 can be formed of various rubbers, foams, elastomers, and the like. As such, suitable seal membrane materials include, but are not intended to be limited to, styrene butadiene rubber, polyurethanes, polyisoprene, neoprene, chlorosulfonated polystyrenes, and the like.

The seal assembly 10 can be activated, i.e., powered, on demand, such as may be desired for various automotive applications. For example, it may be desirable to expand the seal disposed between the door and doorframe or window and door frame to reduce wind noise while driving above a predetermined vehicle speed. Alternatively, the seal can be activated to reduce the forces associated with door closing and opening. For example, the seal assembly 10 can be activated when the vehicle senses a key fob within a predefined distance. Once activated, the material contracts making it easier for an occupant to open and close the door. When the vehicle motor is started, the controller can be made to discontinue the activation signal such that the reversible thermally expandable and/or contractible material 14 expands concomitantly causing the seal membrane 12 to expand so as to improve seal effectiveness between the opposing surfaces. In the latter application, power requirements are advantageously minimized during periods of vehicle inactivity.

In another embodiment, the reversible thermally expandable and/or contractible material 14 comprises a shape memory polymer, which is aligned upon ohmic heating, for example, so as to contract in volume. Upon discontinuation of the activation signal, the shape memory polymer becomes more disordered and expands to its original inactivated shape.

Shape memory polymers (SMPs) generally refer to a group of polymeric materials that demonstrate the ability to return to some previously defined shape when subjected to an appropriate thermal stimulus, e.g., from an expanded configuration to a compact configuration. The shape memory polymer can have an open cell foam structure or a solid structure as may be desired for the intended application. Shape memory polymers are capable of undergoing phase transitions in which their shape orientation is altered as a function of temperature. Generally, SMPs are co-polymers comprised of at least two different units which may be described as defining different segments within the copolymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. The previously defined or permanent shape of the SMP can be set by blow molding the polymer at a temperature higher than the highest thermal transition temperature for the shape memory polymer or its melting point, followed by cooling below that thermal transition temperature.

In practice, the SMPs are alternated between one of at least two shape orientations such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). The SMP are shaped at this temperature by blow molding or shaped with an applied force followed by cooling to set the permanent shape. The temperature necessary to set the permanent shape is generally between about 40° C. to about 300° C. After expansion by fluid, the permanent shape is regained when the applied force is removed, and the expanded SMP is again brought to or above the highest or last transition temperature of the SMP. The Tg of the SMP can be chosen for a particular application by modifying the structure and composition of the polymer. Transition temperatures of suitable SMPs generally range from about −63° C. to above about 160° C.

The temperature needed for permanent shape recovery can be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methaciylate), poly(ethyl methacrylate), poly(butyl methacrylate), poly(isobutyl methacrylate), poly(hexyl methacrylate), poly(isodecyl methacrylate), poly(lauryl mnethacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbomyl-polyhedral oligomeric silsequioxane), polyvinylchloride, urethane/butadiene copolymers, polyurethane block copolymers, styrene-butadienestyrene block copolymers, and the like.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A seal assembly, comprising:
a seal membrane formed of an elastic material, the seal membrane comprising a sealed interior region;
a reversible thermally expandable and contractible material disposed in the interior region;
at least one electrically conductive element in thermal communication with the reversible thermally expandable and contractible material; and
an activation device in electrical communication with the at least one electrically conductive element, the activation device being operable to selectively provide an electrical signal to the at least one electrically conductive element and effectuate a phase change in the reversible thermally expandable and contractible material.

2. The seal assembly of claim 1, wherein the reversible thermally expandable and contractible material comprises paraffin.

3. The seal assembly of claim 1, wherein the reversible thermally expandable and contractible material has a percent volume change between a liquid state and a solid state of at least 5 percent within an operating temperature between about −30 to 200° C.

4. The seal assembly of claim 1, wherein the reversible thermally expandable and contractible material has a Coefficient of Cubic Expansion greater than $4 \times 10^{-4}$ (°C.)$^{-1}$ within an operating temperature of about −30 to about 200° C.

5. The seal assembly of claim 1, wherein the reversible thermally expandable and contractible material contracts in response to an activation signal provided by the activation device.

6. The seal assembly of claim 1, wherein the reversible thermally expandable and contractible material expands in response to an activation signal provided by the activation device.

7. The seal assembly of claim 1, wherein the reversible thermally expandable and contractible material comprises a shape memory polymer.

8. A seal assembly, comprising:
a seal membrane formed of an elastic material, the seal membrane comprising a sealed interior region;
a reversible thermally expandable and contractible material disposed in the interior region; and
at least one conduit in thermal communication with the reversible thermally expandable and contractible material, wherein the conduit is in fluid communication with a fluid effective to heat and cool the reversible thermally expandable and contractible material and effectuate a phase change in the reversible thermally expandable and contractible material.

9. The seal assembly of claim 8, wherein the reversible thermally expandable and contractible material comprises paraffin.

10. The seal assembly of claim 8, wherein the reversible thermally expandable and contractible material has a percent volume change between a liquid state and a solid state of at least 5 percent within an operating temperature between about −30 to 200° C.

11. The seal assembly of claim 8, wherein the reversible thermally expandable and contractible material has a Coefficient of Cubic Expansion greater than $4 \times 10^{-4}$ (°C.)$^{-1}$ within an operating temperature of about −30 to about 200° C.

12. The seal assembly of claim 8, wherein the reversible thermally expandable and contractible material contracts in response to the activation signal.

13. The seal assembly of claim 8, wherein the reversible thermally expandable and contractible material expands in response to the activation signal.

14. The seal assembly of claim 8, wherein the reversible thermally expandable and contractible material comprises a shape memory polymer.

15. A method for selectively sealing a first surface against a second surface, comprising:
attaching a seal assembly to a selected one of the first surface and the second surface, wherein the seal assembly comprises a seal membrane formed of an elastic material comprising a sealed interior region, a reversible thermally expandable and contractible material disposed in the interior region; and at least one electrically conductive element in thermal communication with the reversible thermally expandable and contractible material, wherein the seal membrane contacts the selected one of first surface and the second surface and the reversible thermally expandable and contractible material has a percent volume change between a liquid state and a solid state of at least 5 percent within an operating temperature between about −30 to 200° C.; and
selectively expanding and contracting the reversible thermally expandable and contractible material to selectively increase or decrease a sealing force of the seal membrane against the first surface and the second surface.

16. The method of claim 15, wherein the reversible thermally expandable and contractible material comprises paraffin.

17. The method of claim 15, wherein the reversible thermally expandable and contractible material has a Coefficient of Cubic Expansion greater than $4 \times 10^{-4}$ (°C.)$^{-1}$ within an operating temperature of about −30 to about 200° C.

18. The method of claim 15, wherein the reversible thermally expandable and contractible material contracts.

19. The method of claim 15, wherein the reversible thermally expandable and contractible material expands.

20. The method of claim 15, wherein the reversible thermally expandable and contractible material comprises a shape memory polymer.

21. A method for selectively sealing a first surface against a second surface, comprising:
attaching a seal assembly to a selected one of the first surface and the second surface, wherein the seal assembly comprises a seal membrane formed of an elastic material comprising a sealed interior region, a reversible thermally expandable and contractible material disposed in the interior region; and at least one fluid conduit in thermal communication with the reversible thermally expandable and contractible material, wherein the seal membrane contacts the selected one of first surface and the second surface; and
flowing a fluid through the conduit to selectively expand and contract the reversible thermally expandable and contractible material and effectuate a phase change in the reversible thermally expandable and contractible material and increase or decrease a sealing force of the seal membrane against the first surface and the second surface.

22. The method of claim 21, wherein flowing the fluid through the conduit comprises flowing coolant from a radiator and into the conduit.

23. The method of claim 21, wherein flowing the fluid through the conduit comprises flowing heated or cooled air into the conduit.

24. The method of claim 21, wherein the reversible thermally expandable and contractible material comprises paraffin.

25. The method of claim 21, wherein the reversible thermally expandable and contractible material has a percent volume change between a liquid state and a solid state of at least 5 percent within an operating temperature between about −30 to 200° C.

26. The method of claim 21, wherein the reversible thermally expandable and contractible material has a Coefficient of Cubic Expansion greater than $4 \times 10^{-4}$ (°C.)$^{-1}$ within an operating temperature of about −30 to about 200° C.

27. The method of claim 21, wherein the reversible thermally expandable and contractible material contracts.

28. The method of claim 21, wherein the reversible thermally expandable and contractible material expands.

29. The method of claim 21, wherein the reversible thermally expandable and contractible material comprises a shape memory polymer.

30. A remotely activatable seal assembly comprising:
- a seal membrane formed of an elastic material, the seal membrane comprising a sealed interior region;
- a reversible thermally expandable and contractible material disposed in the sealed interior region; and
- at least one conductive element in thermal communication with the reversible thermally expandable and contractible material and remotely activated and caused to heat or cool the reversible thermally expandable and contractible material and effectuate a phase change in the reversible thermally expandable and contractible material.

* * * * *